US012789714B2

(12) United States Patent
Loza Zuñiga et al.

(10) Patent No.: US 12,789,714 B2
(45) Date of Patent: Nov. 10, 2026

(54) BICYCLE MOUNTING ASSEMBLY FOR A VEHICLE

(71) Applicant: Ford Global Technologies, LLC, Dearborn, MI (US)

(72) Inventors: Uriel Elam Loza Zuñiga, Tultitlan (MX); Jesús Alfredo Mendoza González, Alvaro Obregon (MX); Luis Jesus Chavela Guerra, Lomas del Salitre (MX); Cuauhtemoc Quiroz Garfias, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 18/939,004

(22) Filed: Nov. 6, 2024

(65) Prior Publication Data

US 2026/0124997 A1 May 7, 2026

(51) Int. Cl.
*B60R 9/10* (2006.01)

(52) U.S. Cl.
CPC .................................... *B60R 9/10* (2013.01)

(58) Field of Classification Search
CPC ........................................................ B60R 9/10
USPC ....................................................... 224/42.33
See application file for complete search history.

(56) References Cited

U.S. PATENT DOCUMENTS 3,828,993 A * 8/1974 Carter ..................... B60R 9/048 280/304.5
4,842,148 A * 6/1989 Bowman ................. B60R 9/048 248/316.1
4,934,572 A * 6/1990 Bowman ................... B60R 9/00 224/570
5,037,019 A * 8/1991 Sokn ......................... B60R 9/00 224/570
5,699,684 A * 12/1997 Sulin ........................ B62H 3/00 211/5
5,699,945 A * 12/1997 Micklish ................... B60R 9/10 224/924
6,036,069 A * 3/2000 Sayegh ................... B60R 9/048 224/924
6,167,735 B1 * 1/2001 Brown ...................... B60R 9/10 211/5
(Continued)

FOREIGN PATENT DOCUMENTS

KR 101786731 B1 10/2017

OTHER PUBLICATIONS

Yakima Locking Bedhead Mount, accessed from https://www.rack-it.com/product/yakima-locking-bedhead-54512-1.htm on Sep. 6, 2024.
(Continued)

*Primary Examiner* — Nathan J Newhouse
*Assistant Examiner* — Lester L Vanterpool
(74) *Attorney, Agent, or Firm* — Vichit Chea; Carlson, Gaskey & Olds, P.C.

(57) ABSTRACT

A bicycle mounting assembly can include a mounting bracket, a fork mount held by the mounting bracket, and a clamping knob transitionable back-and-forth between an adjustment position and a clamping position. The fork mount is rotatable relative to the mounting bracket when the clamping knob is in the adjustment position. The fork mount is held in a mounting position when the clamping knob is in the clamping position.

20 Claims, 5 Drawing Sheets

(56) References Cited

U.S. PATENT DOCUMENTS

| | | | | |
|---|---|---|---|---|
| 7,229,116 | B1 * | 6/2007 | Bruford | B60P 3/40<br>296/57.1 |
| 7,857,177 | B2 | 12/2010 | Reeves et al. | |
| D689,012 | S * | 9/2013 | Kuschmeader | D12/408 |
| 9,248,784 | B2 * | 2/2016 | Kraeuter | B60R 9/10 |
| 9,517,729 | B2 * | 12/2016 | Peck | B60R 9/06 |
| 9,598,023 | B2 * | 3/2017 | Kisaka | B60R 9/10 |
| 9,821,721 | B2 * | 11/2017 | Casagrande | B60R 9/08 |
| 10,252,758 | B2 * | 4/2019 | Lickton | B62H 3/10 |
| 11,970,233 | B1 * | 4/2024 | Wirtz | B62H 3/10 |
| 12,427,929 | B2 * | 9/2025 | McKeever | B60R 9/10 |
| 2002/0053581 | A1 * | 5/2002 | Peschmann | B60R 9/10<br>224/924 |
| 2004/0084491 | A1 | 5/2004 | Gibson | |
| 2004/0159690 | A1 * | 8/2004 | Hansen | B60R 9/00<br>224/403 |
| 2005/0082324 | A1 | 4/2005 | Schlachter | |
| 2006/0255082 | A1 * | 11/2006 | Tsai | B60R 11/00<br>224/567 |
| 2006/0263163 | A1 | 11/2006 | Harberts et al. | |
| 2008/0061198 | A1 * | 3/2008 | Noyes | B60R 9/048<br>29/11 |
| 2009/0173762 | A1 * | 7/2009 | Wang | B60P 7/0807<br>224/402 |
| 2009/0266773 | A1 * | 10/2009 | Janeczko | B62H 3/00<br>211/5 |
| 2014/0091551 | A1 * | 4/2014 | Walter | B62K 5/08<br>29/401.1 |
| 2014/0367437 | A1 * | 12/2014 | D' Angelo | B60R 11/00<br>224/567 |
| 2015/0151687 | A1 * | 6/2015 | Tsai | B60R 9/048<br>224/324 |
| 2015/0203051 | A1 | 7/2015 | Tofte et al. | |
| 2015/0210222 | A1 * | 7/2015 | Kisaka | B60R 9/10<br>224/42.38 |
| 2016/0131166 | A1 | 5/2016 | Cox | |
| 2020/0269768 | A1 * | 8/2020 | Jarrard | B60R 9/10 |
| 2020/0331406 | A1 * | 10/2020 | Casagrande | B60R 9/08 |
| 2022/0242329 | A1 | 8/2022 | Ward et al. | |
| 2024/0391393 | A1 * | 11/2024 | McKeever | B60R 9/10 |
| 2025/0121777 | A1 * | 4/2025 | Hickman guevara | B60R 9/10 |

OTHER PUBLICATIONS

Thule Bed Rider Pro Mount, accessed from https://www.thule.com/en-US/bike-rack/truck-bed-bike-racks/thule-bed- rider-pro-add-on-block-_-822103 on Sep. 6, 2024.

Kuat Dirtbag Bike Rack—Fork Mount—Bold On—15 mm Thru-Axle Skewer, accessed from https://www.etrailer.com/Truck-Bed-Bike-Racks/Kuat/DRT15.html?srsltid=AfmBOoom-n-pRJ9K7opPSP_eurLcdTOz8_hsjveoudIkMOIDPd3xley0 on Sep. 6, 2024.

* cited by examiner

BICYCLE MOUNTING ASSEMBLY FOR A VEHICLE

TECHNICAL FIELD

This disclosure relates generally to a bicycle mounting assembly for a vehicle and, more specifically, to a bicycle mounting assembly that is rotatable.

BACKGROUND

A bicycle can include a bicycle fork that holds a wheel. When storing or transporting the bicycle, the bicycle fork can be secured to a bicycle fork mount. The wheel of the bicycle can be removed prior to securing the bicycle fork to the bicycle fork mount. Some vehicles can include the bicycle fork mount in a cargo area of the vehicle.

SUMMARY

In some aspects, the techniques described herein relate to a bicycle mounting assembly including: a mounting bracket; a fork mount held by the mounting bracket; and a clamping knob transitionable back-and-forth between an adjustment position and a clamping position, the fork mount rotatable relative to the mounting bracket when the clamping knob is in the adjustment position, the fork mount held in a mounting position when the clamping knob is in the clamping position.

In some aspects, the techniques described herein relate to a bicycle mounting assembly, wherein the mounting bracket includes a first flange, a second flange, and a mounting plate, the first flange and the second flange extending transversely from opposing sides of a mounting plate.

In some aspects, the techniques described herein relate to a bicycle mounting assembly, further including a plurality of mechanical fasteners that extend through the mounting plate to attach the mounting bracket to a vehicle structure.

In some aspects, the techniques described herein relate to a bicycle mounting assembly, wherein the plurality of mechanical fasteners are a plurality of threaded fasteners.

In some aspects, the techniques described herein relate to a bicycle mounting assembly, wherein the first flange and the second flange each include an aperture that receives a stem of the fork mount.

In some aspects, the techniques described herein relate to a bicycle mounting assembly, wherein the stem extends through the aperture in the first flange and through the aperture in the second flange.

In some aspects, the techniques described herein relate to a bicycle mounting assembly, wherein the clamping knob is engageable with the stem.

In some aspects, the techniques described herein relate to a bicycle mounting assembly, wherein the stem includes a threaded stem bore that receives a threaded shaft 1, wherein the fork mount can be rotated between 0 and 360 degrees relative to the mounting bracket when the clamping knob is in the adjustment position.

In some aspects, the techniques described herein relate to a bicycle mounting assembly, wherein the fork mount includes a connecting rod and a stem extending transversely from the stem along a stem axis, the connecting rod configured to be releasably coupled to a bicycle fork, the connecting rod and the stem rotatable 360 degrees about the stem axis relative to the mounting bracket when the clamping knob is in the adjustment position.

In some aspects, the techniques described herein relate to a bicycle mounting assembly, further including a pair of fork mount caps disposed on opposing ends of the connecting rod.

In some aspects, the techniques described herein relate to a bicycle mounting assembly for a vehicle including: a cargo bed that is aft a passenger compartment of a vehicle, the cargo bed provided between a first sidewall assembly and a second sidewall assembly, and a bicycle mounting assembly including: a mounting bracket secured to one of the first sidewall assembly or the second sidewall assembly, a fork mount held by the mounting bracket, and a clamping knob transitionable back-and-forth between an adjustment position and a clamping position, the fork mount rotatable relative to the mounting bracket when the clamping knob is in the adjustment position, the fork mount held in a mounting position when the clamping knob is in the clamping position.

In some aspects, the techniques described herein relate to a bicycle mounting assembly, wherein the fork mount is rotatable relative to the mounting bracket about a vertical axis.

In some aspects, the techniques described herein relate to a bicycle mounting assembly, wherein the first sidewall assembly and the second sidewall assembly each include a D-pillar, the mounting bracket secured to the D-pillar of one of the first sidewall assembly or the second sidewall assembly.

In some aspects, the techniques described herein relate to a bicycle mounting assembly, wherein the mounting bracket is secured to a forward facing side of the D-pillar.

In some aspects, the techniques described herein relate to a bicycle mounting assembly, wherein the fork mount includes a connecting rod, the connecting rod engaged with a bicycle fork of a bicycle with the bicycle is mounted to the fork mount.

In some aspects, the techniques described herein relate to a bicycle mounting assembly, wherein the fork mount has a connecting rod and a stem, wherein the connecting rod is configured to be releasably coupled to a bicycle fork of a bicycle frame, wherein the clamping knob is directly engaged with the stem of the fork mount when the clamping knob is in the clamping position.

In some aspects, the techniques described herein relate to a bicycle mounting assembly, wherein the stem extends transversely from the connecting rod along a stem axis, the connecting rod and the stem rotatable together 360 degrees about the stem axis relative to the mounting bracket when the clamping knob is in the adjustment position.

In some aspects, the techniques described herein relate to a bicycle mounting assembly, wherein, when the connecting rod is coupled to the bicycle fork, the bicycle frame is disposed within the cargo bed at an angle relative to a centerline of the vehicle.

In some aspects, the techniques described herein relate to a bicycle mounting assembly, wherein the clamping knob is vertically beneath the connecting rod.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to a bicycle mounting assembly that can be rotated to a plurality of different positions. The bicycle mounting assembly can be used to hold a bicycle in a cargo bed of a vehicle. In an example, to secure the bicycle, a wheel of the bicycle is removed. The bicycle is then secured to the bicycle mounting assembly through the bicycle forks that formerly held the wheel. Because the bicycle mounting assembly can be rotated, the bicycle can be, for example, positioned within the cargo bed at an angle relative to a centerline of the vehicle. This can facilitate transport of the bicycle in a vehicle having a relatively short cargo bed. That is, because the bicycle is secured within the cargo bed at an angle, the bicycle does not extend rearward beyond a floor of the cargo bed, and a user can close a tailgate of the vehicle while transporting a bicycle that is secured to the bicycle mounting assembly.

Figure 1:
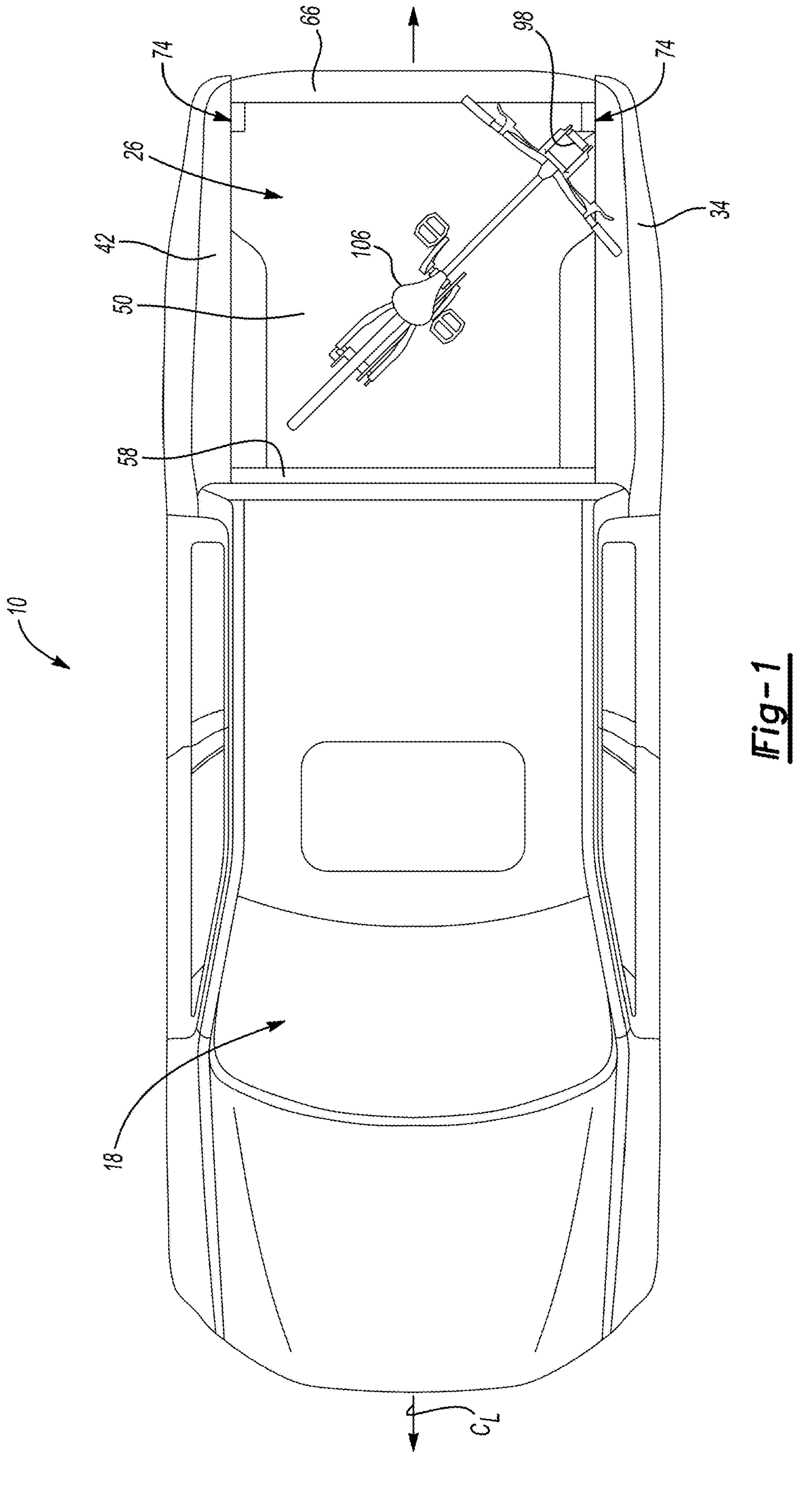
FIG. 1 illustrates a top view of vehicle having a cargo bed and a bicycle mounted to a bicycle mounting assembly within the cargo bed according to an exemplary embodiment of the present disclosure.
Figure 2:
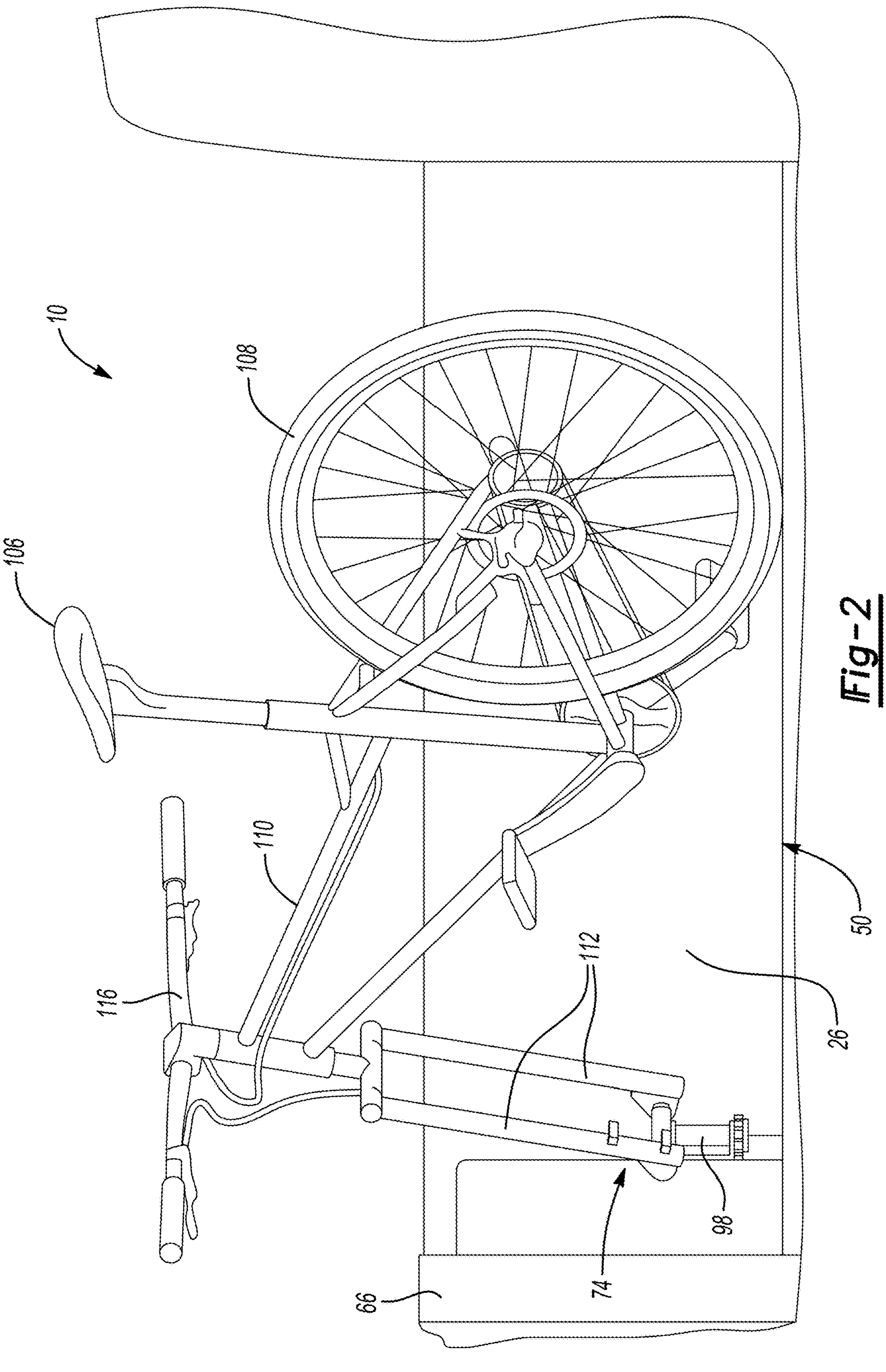
FIG. 2 illustrates a section view taken through the cargo bed of FIG. 1.

FIGS. 1 and 2 illustrate an example vehicle 10 having a passenger compartment 18 and a cargo bed 26. The vehicle 10 is a pickup truck in this example.

The vehicle 10 has a centerline $C_L$. The cargo bed 26 is aft of the passenger compartment 18 along the centerline $C_L$. Terms such as "forward" and "aft" are, for purposes of this disclosure, with reference to an orientation of the vehicle 10.

The cargo bed 26 is established between a first sidewall assembly 34 and a second sidewall assembly 42, which extend upward from opposing sides of a cargo bed floor 50. The first sidewall assembly 34 is on a driver side of the cargo bed 26. The second sidewall assembly 42 is on a passenger side of the cargo bed 26.

A front wall 58 encloses a forward end of the cargo bed 26. A tailgate 66 in a closed position encloses an aft end of the cargo bed 26. The tailgate 66 can be pivoted from the closed position shown to an open position to facilitate loading items into the cargo bed 26.

Figure 3:
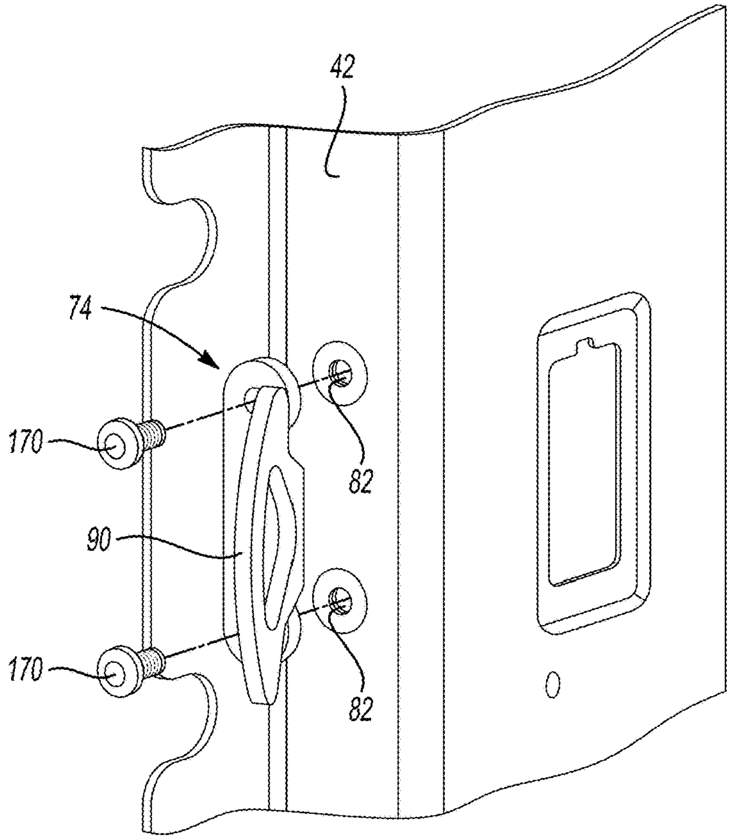
FIG. 3 illustrates a close up view of a D-pillar structure on a sidewall of the vehicle of FIG. 1.

Aft end portions of the first sidewall assembly 34 and the second sidewall assembly 42 each include a D-pillar structure 74. The tailgate 66 spans between the D-pillar structures 74 when the tailgate 66 is in the closed position. The D-pillar structures 74, in this example, each include two threaded pillar bores 82 that open to a forward facing side 86 of the respective D-pillar structure 74. A D-pillar tie-down 90, illustrated in FIG. 3, can be secured to the D-pillar structure 74 with mechanical fasteners 170 that engage the threaded pillar bores 82. The D-pillar tie-down 90 can be used to, for example, anchor ropes, straps, cables, etc. that secure items within the cargo bed 26.

In the exemplary embodiment, the D-pillar tie down 90 is shown attached to the D-pillar structure 74 of the second sidewall assembly 42. No D-pillar tie down 90 is attached to the D-pillar structure 74 of the first sidewall assembly 34. Instead, the D-pillar tie down 90 has been removed and replaced with a bicycle mounting assembly 98 that is attached to D-pillar structure 74 using the threaded pillar bores 82. A user can use the bicycle mounting assembly 98 to secure a bicycle 106 within the cargo bed 26. As the threaded pillar bores 82 are used to secure the bicycle mounting assembly 98, no substantial modifications to the D-pillar 74 are required to accommodate the bicycle mounting assembly 98.

Figure 4:
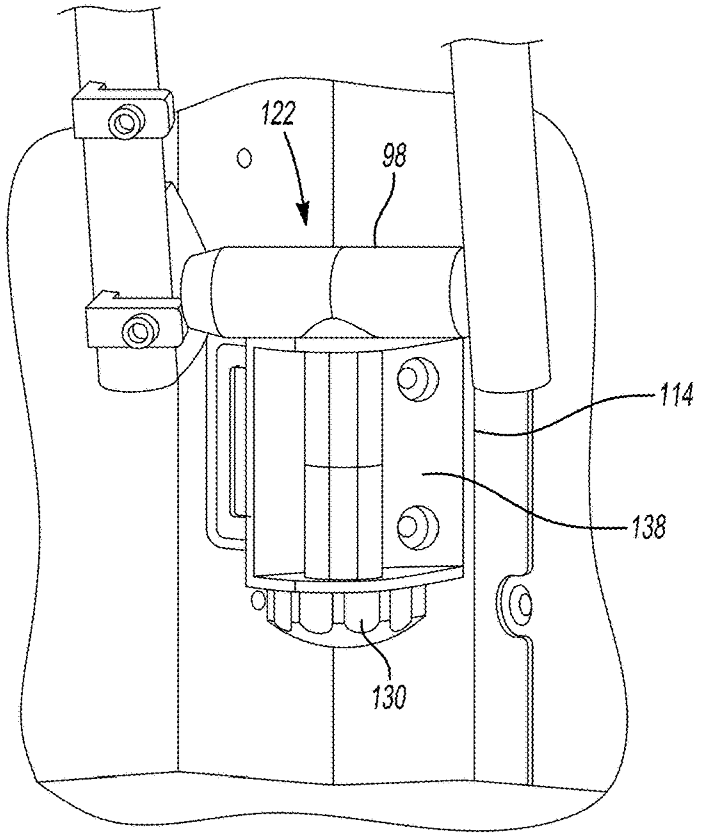
FIG. 4 illustrates a perspective view of an area of FIG. 1 showing the bicycle mounting assembly and a portion of the bicycle.
Figure 5:
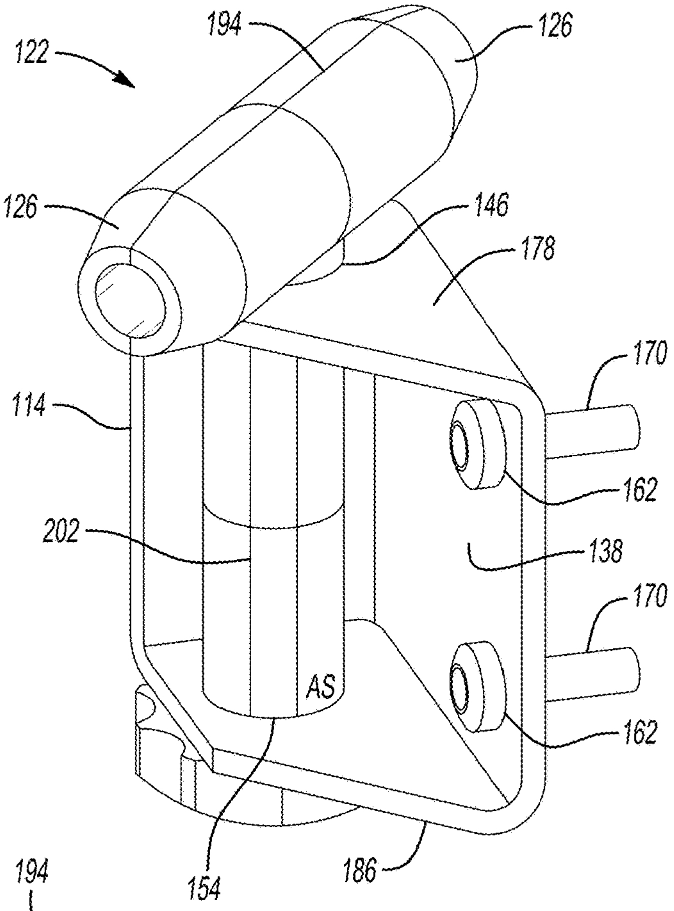
FIG. 5 illustrates a perspective view of the bicycle mounting assembly of FIG. 1.
Figure 6:
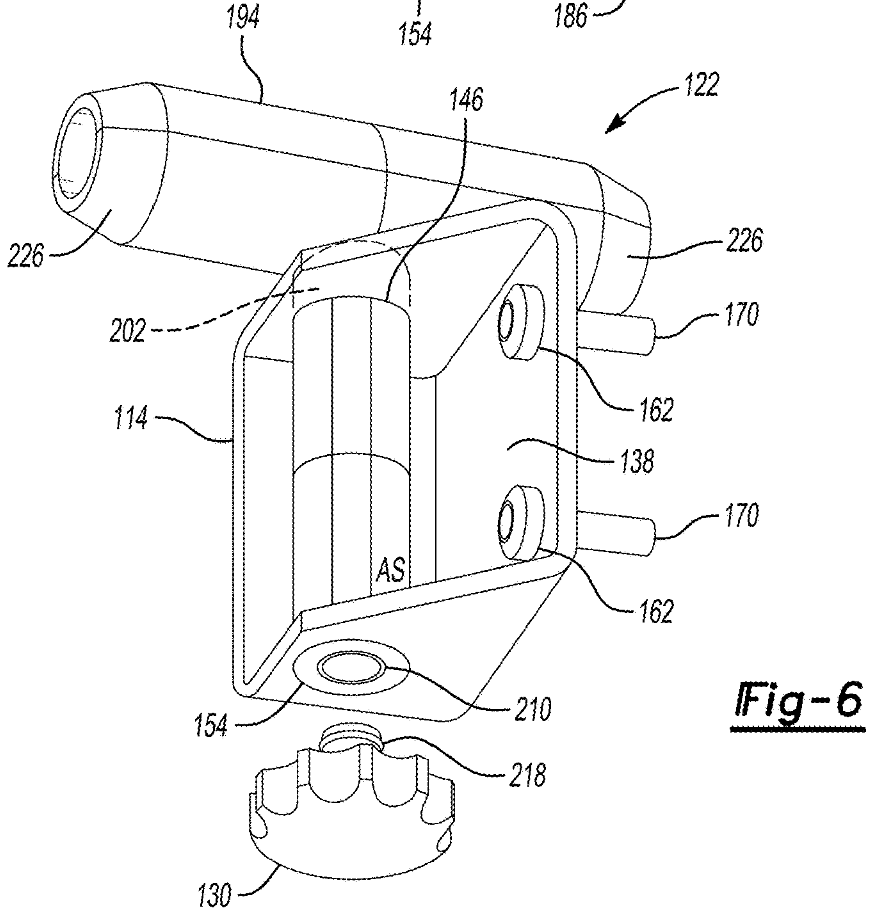
FIG. 6 illustrates an expanded view of the bicycle mounting assembly of FIG. 1.

With reference now to FIGS. 4-6 and continuing reference to FIGS. 1 and 2, the bicycle mounting assembly 98, according to an exemplary embodiment of the present disclosure, includes a mounting bracket 114, a fork mount 122, and a clamping knob 130. In the exemplary embodiment, when the mounting bracket 114 holds the fork mount 122, the clamping knob 130 can be transitioned back and forth between an adjustment position where the fork mount 122 can be rotated relative to the mounting bracket 114, and a clamping position where the fork mount 122 is fixed relative to the mounting bracket 114.

The example mounting bracket 114 includes a mounting plate 138, a first flange 146, and a second flange 154. The mounting plate 138 includes apertures 162. A mechanical fastener 170, here a bolt, extends through each of the apertures 162 and threadedly engages the threaded pillar bores 82 in the D-pillar structure 74 to secure the mounting bracket 114 to the D-pillar 74.

The first flange 146 and the second flange 154 extend transversely from opposing sides of the mounting plate 138. In this example, when the mounting bracket 114 is secured to the D-pillar structure 74, the first flange 146 extends horizontally from an upper side 178 of the mounting plate 138, and the second flange 154 extends horizontally from a lower side 186 of the mounting plate 138.

The fork mount 122 includes a connecting rod 194 and a stem 202 that extends transversely from the stem 202 along a stem axis $A_S$. The fork mount 122 has a "T" shape. The connecting rod 194 provides a T-top and the stem 202 provides a stem 202 of the "T" shape. When the fork mount 122 is held by the mounting bracket 114, the stem 202 extends through a first aperture 162 in the first flange 146 and a second aperture 162 in the second flange 154.

The stem 202 includes a threaded stem bore 210 that can receive a threaded shaft 218 of the clamping knob 130. In this example, the threaded shaft 218 threadedly engages the threaded stem bore 210 and is tightened to hold the clamping knob 130 in the clamping position. When in the clamping position, the fork mount 122 is clamped against the mounting bracket 114 and a position of the fork mount 122 relative to the mounting bracket 114 is fixed. That is, the example fork mount 122 is not rotatable relative to the mounting bracket 114 about the stem axis $A_S$ when the clamping knob 130 is in the clamping position.

To transition the clamping knob 130 to the adjustment position, the clamping knob 130 is turned to release the clamping force. When in the adjustment position, the fork mount 122 can be rotated about the stem axis $A_S$ relative to the mounting bracket 114. The fork mount 122 can be rotated about the stem axis $A_S$ 360 degrees relative to the mounting bracket 114 when the clamping knob 130 is in the adjustment position. A user can rotate the fork mount 122 to a desired position when the clamping knob 130 is in the adjustment position, and then turn the clamping knob 130 to engage the fork mount 122 and to hold the fork mount 122 in the desired position.

To secure the bicycle 106 within the cargo bed 26, a tire 108 of the bicycle 106 is removed from a bicycle frame 110. Fork arms 112 of the bicycle frame, which formerly engaged the tire 108, are then connected to the connecting rod 194 of the fork mount 122. Opposite ends of the connecting rod 194 can include fork mount caps 226. The fork mount caps 226 can be tightened against the fork arms 112 to secure the bicycle 106 to the connecting rod 194. For purposes of this disclosure, although the tire 108 has been removed, the bicycle 106 is considered secured to the fork mount 122 when the fork arms 112 are coupled to the connecting rod 194.

As the fork mount 122 can be rotated, the connecting rod 194 can be positioned such that the bicycle 106 can be secured in the cargo bed 26 with the bicycle 106 arranged at an angle relative to the centerline CL of the vehicle 10. The bicycle 106 can be secured in the cargo bed 26 without handlebars 116 of the bicycle 106 overhanging the tailgate 66, the first sidewall assembly 34, or the second sidewall assembly 42. The bicycle 106 can be within the cargo bed 26 at an angle to the centerline CL with the handlebars 116 is a straight position.

Figure 7:
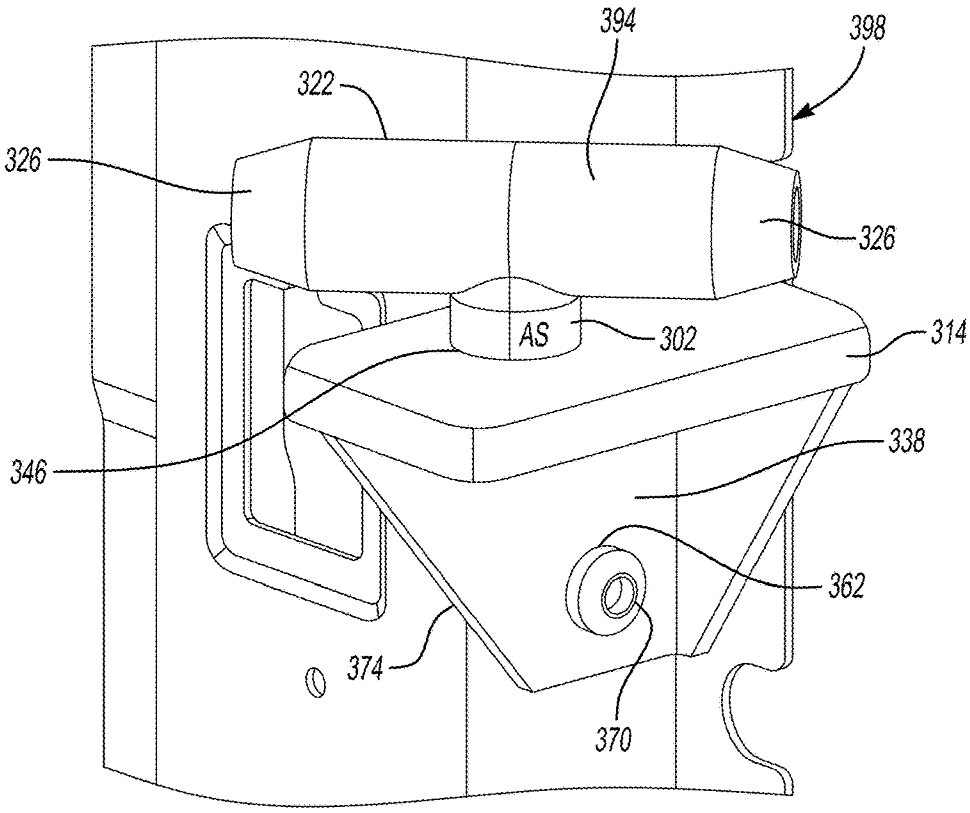
FIG. 7 illustrates a perspective view of a bicycle mounting assembly that can be used in the vehicle of FIG. 1 according to another exemplary embodiment of the present disclosure.
Figure 8:
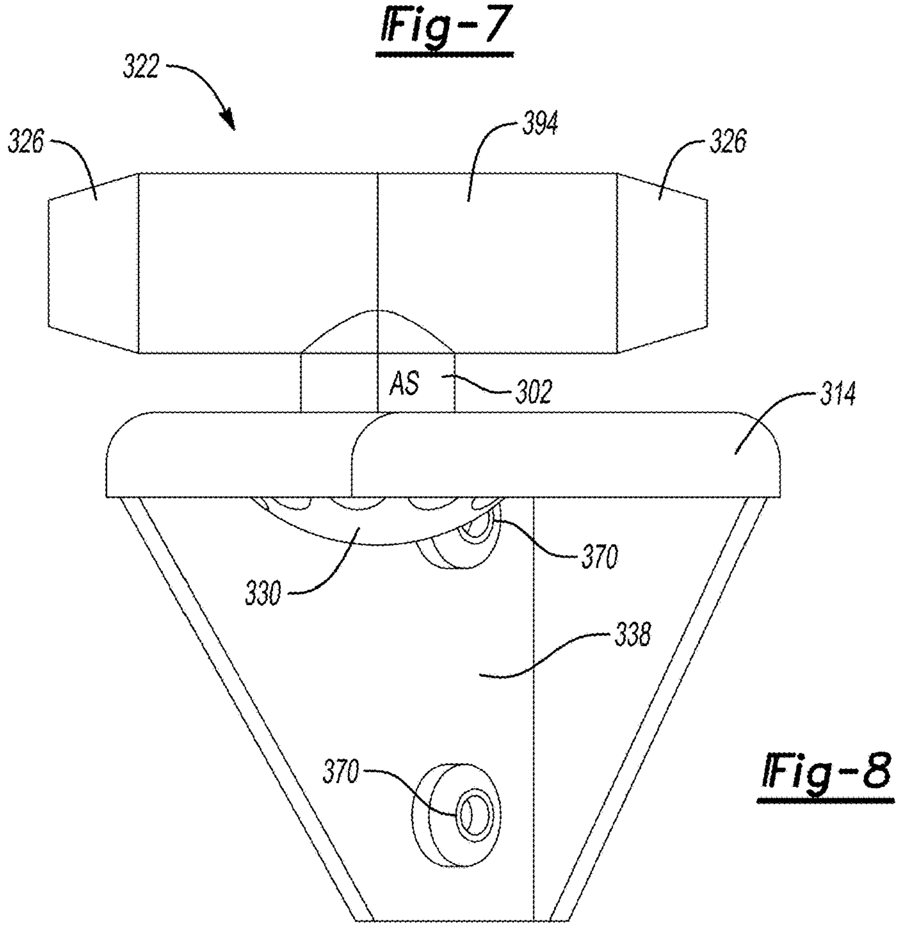
FIG. 8 illustrate a perspective view of the bicycle mounting assembly of FIG. 7 attached to a D-Pillar tie down.

FIGS. 7 and 8 illustrate an alternative embodiment of the bicycle mounting assembly 398. In this embodiment, a bicycle mounting assembly 398 includes a mounting bracket 314, a fork mount 322, and a clamping knob 330. In the exemplary embodiment, the mounting bracket 314 holds the fork mount 322. The clamping knob 330 can be transitioned back and forth between an adjustment position where the fork mount 322 can be rotated relative to the mounting bracket 314, and a clamping position where the fork mount 322 is fixed relative to the mounting bracket 314.

The exemplary mounting bracket 314 includes a mounting plate 338 and a flange 346. The mounting plate 338 also includes apertures 362. A mechanical fastener 370, here a bolt, extends through each of the apertures and threadedly engages a D-pillar 374 to secure the mounting bracket 314 to the D-pillar 374.

The flange 346 extends vertically from an upper side of the mounting plate 338. A bracing flange 350 extends from the mounting plate 338 to the flange 346 to help support the flange 346. The fork mount 322 further includes a connecting rod 394 and a stem 302 that extends transversely from the stem 302 along a stem axis $A_S$. The fork mount 322 has a "T" shape with the connecting rod 394 providing a T-top and the stem 302 providing a stem of the "T" shape. The "T" shape in this exemplary fork mount 322 features a shorter stem 302 length compared to the other fork mount 122 embodiment. When the fork mount 322 is held by the mounting bracket 314, the stem 302 extends through the flange 346. Opposite ends of the connecting rod 394 can include fork mount caps 326.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A bicycle mounting assembly comprising:
a mounting bracket;
a fork mount held by the mounting bracket; and
a clamping knob transitionable back-and-forth between an adjustment position and a clamping position, the fork mount rotatable relative to the mounting bracket to any of a plurality of rotational positions when the clamping knob is in the adjustment position, the fork mount held in a mounting position when the clamping knob is in the clamping position, wherein the mounting position is a selected one of the plurality of rotational positions such that the clamping knob in the clamping position is configured to hold the fork mount in any of the plurality of rotational positions.

2. The bicycle mounting assembly of claim 1, wherein the mounting bracket comprises a first flange, a second flange, and a mounting plate, the first flange and the second flange extending transversely from opposing sides of a mounting plate.

3. The bicycle mounting assembly of claim 2, further comprising a plurality of mechanical fasteners that extend through the mounting plate to attach the mounting bracket to a vehicle structure.

4. The bicycle mounting assembly of claim 3, wherein the plurality of mechanical fasteners are a plurality of threaded fasteners.

5. A bicycle mounting assembly comprising:
a mounting bracket;
a fork mount held by the mounting bracket; and
a clamping knob transitionable back-and-forth between an adjustment position and a clamping position, the fork mount rotatable relative to the mounting bracket when the clamping knob is in the adjustment position, the fork mount held in a mounting position when the clamping knob is in the clamping position,
wherein the mounting bracket comprises a first flange, a second flange, and a mounting plate, the first flange and the second flange extending transversely from opposing sides of a mounting plate,
wherein the first flange and the second flange each include an aperture that receives a stem of the fork mount.

6. The bicycle mounting assembly of claim 5, wherein the stem extends through the aperture in the first flange and through the aperture in the second flange.

7. The bicycle mounting assembly of claim 5, wherein the clamping knob is engageable with the stem.

8. The bicycle mounting assembly of claim 5, wherein the stem includes a threaded stem bore that receives a threaded shaft of the clamping knob when the clamping knob and the stem are engaged with each other.

9. The bicycle mounting assembly of claim 1, wherein the fork mount can be rotated between 0 and 360 degrees relative to the mounting bracket when the clamping knob is in the adjustment position, and the fork mount can be secured relative to the mounting bracket in any rotational position between the 0 and 360 degrees when the clamping knob is in the clamping position.

10. The bicycle mounting assembly of claim 1, wherein the fork mount includes a connecting rod and a stem extending transversely from the connecting rod along a stem axis, the connecting rod configured to be releasably coupled to a bicycle fork, the connecting rod and the stem rotatable 360 degrees about the stem axis relative to the mounting bracket when the clamping knob is in the adjustment position.

11. The bicycle mounting assembly of claim 10, further comprising a pair of fork mount caps disposed on opposing ends of the connecting rod.

12. A bicycle mounting assembly for a vehicle comprising:

a cargo bed that is aft a passenger compartment of a vehicle, the cargo bed provided between a first sidewall assembly and a second sidewall assembly; and a bicycle mounting assembly including:

a mounting bracket secured to one of the first sidewall assembly or the second sidewall assembly, a fork mount held by the mounting bracket, and a clamping knob transitionable back-and-forth between an adjustment position and a clamping position, the fork mount rotatable relative to the mounting bracket to any of a plurality of rotational positions when the clamping knob is in the adjustment position, the fork mount held in a mounting position when the clamping knob is in the clamping position, wherein the mounting position is a selected one of the plurality of rotational positions such that the clamping knob in the clamping position is configured to hold the fork mount in any of the plurality of rotational positions.

13. The bicycle mounting assembly of claim 12, wherein the fork mount is rotatable relative to the mounting bracket about a vertical axis.

14. The bicycle mounting assembly of claim 12, wherein the first sidewall assembly and the second sidewall assembly each include a D-pillar, the mounting bracket secured to the D-pillar of one of the first sidewall assembly or the second sidewall assembly.

15. The bicycle mounting assembly of claim 14, wherein the mounting bracket is secured to a forward facing side of the D-pillar.

16. The bicycle mounting assembly of claim 12, wherein the fork mount includes a connecting rod, the connecting rod engaged with a bicycle fork of a bicycle when the bicycle is mounted to the fork mount.

17. The bicycle mounting assembly of claim 12, wherein the fork mount has a connecting rod and a stem, wherein the connecting rod is configured to be releasably coupled to a bicycle fork of a bicycle frame, wherein the clamping knob is directly engaged with the stem of the fork mount when the clamping knob is in the clamping position.

18. The bicycle mounting assembly of claim 17, wherein the stem extends transversely from the connecting rod along a stem axis, the connecting rod and the stem rotatable together 360 degrees about the stem axis relative to the mounting bracket when the clamping knob is in the adjustment position.

19. The bicycle mounting assembly of claim 17, wherein, when the connecting rod is coupled to the bicycle fork, the bicycle frame is disposed within the cargo bed at an oblique angle relative to a centerline of the vehicle.

20. The bicycle mounting assembly of claim 17, wherein the clamping knob is vertically beneath the connecting rod.

* * * * *